(12) United States Patent
Zhang et al.

(10) Patent No.: US 10,114,173 B2
(45) Date of Patent: Oct. 30, 2018

(54) OPTICAL DEVICE

(71) Applicants: Chunshu Zhang, Ottawa (CA);
Dominic John Goodwill, Ottawa (CA)

(72) Inventors: Chunshu Zhang, Ottawa (CA);
Dominic John Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/458,363

(22) Filed: Mar. 14, 2017

(65) Prior Publication Data

US 2018/0267246 A1    Sep. 20, 2018

(51) Int. Cl.
   *G02B 6/12* (2006.01)
   *G02B 6/293* (2006.01)
   *G02B 6/122* (2006.01)

(52) U.S. Cl.
   CPC ....... *G02B 6/29338* (2013.01); *G02B 6/1221* (2013.01); *G02B 6/29343* (2013.01); *G02B 6/29382* (2013.01); *G02B 2006/12061* (2013.01)

(58) Field of Classification Search
   CPC .............. G02B 6/1221; G02B 6/29343; G02B 6/12061; G02B 6/122
   See application file for complete search history.

(56) References Cited

U.S. PATENT DOCUMENTS

| | | | | |
|---|---|---|---|---|
| 5,408,492 A | * | 4/1995 | Vossler | G01C 19/66 356/461 |
| 6,052,495 A | * | 4/2000 | Little | G02F 1/011 385/2 |
| 7,110,640 B2 | * | 9/2006 | LoCascio | B82Y 10/00 385/27 |
| 2006/0078254 A1 | * | 4/2006 | Djordjev | G02B 6/12007 385/32 |

(Continued)

FOREIGN PATENT DOCUMENTS

| | | |
|---|---|---|
| CN | 101344615 A | 1/2009 |
| CN | 102062988 A | 5/2011 |
| JP | 2008304216 A | 12/2008 |

OTHER PUBLICATIONS

Lindenmann et al., "Photonic wire bonding: a novel concept for chipscale Interconnects," Opt. Express 20(16), 17667, Jul. 30, 2012.

(Continued)

*Primary Examiner* — Sung Pak
*Assistant Examiner* — Hoang Tran

(57) ABSTRACT

An aspect of the disclosure provides a microring resonator (MRR). Such an MRR includes a ring optical waveguide and an optical waveguide, with the optical waveguide configured such that a first portion of the optical waveguide overlaps a second portion of the ring waveguide. In some embodiments, the optical waveguide has a first refractive index and the ring optical waveguide has a second refractive index such that the first refractive index is less than the second refractive index. In some embodiments, the optical wave- (Continued)

guide is a polymer optical waveguide and the ring optical waveguide is a silicon optical waveguide. In some embodiments, the optical waveguide is larger in height than the ring waveguide and the first portion of the optical waveguide is configured to provide space for the second portion of the ring waveguide.

19 Claims, 11 Drawing Sheets

(56) References Cited

U.S. PATENT DOCUMENTS

2007/0127861 A1   6/2007   De Almeida et al.
2009/0016677 A1   1/2009   Vlasov

OTHER PUBLICATIONS

Ji et al., "Microring-resonator-based four-port optical router for photonic networks-on-chip," Opt. Express 19(20), 18945, Sep. 26, 2011.
Leinse et al., "High speed electro optic polymer micro-ring resonator," IEEE/LEOS Benelux Chapter, 2004.

* cited by examiner

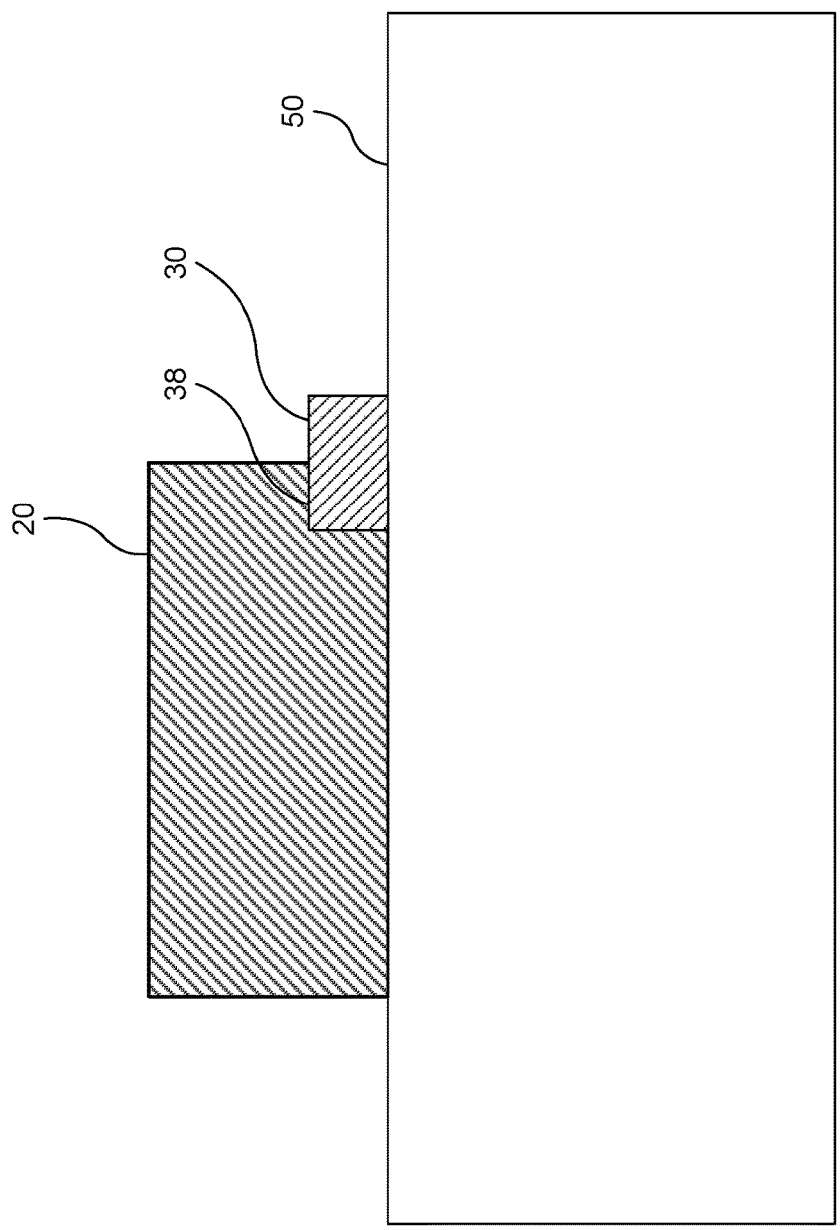

OPTICAL DEVICE

FIELD OF THE INVENTION

The present invention pertains to the field of communication networks, and in particular to Photonic Integrated Circuits (PIC) technologies, such as silicon photonics.

BACKGROUND

Optical switches and tunable optical filters are valuable elements in modern photonic networks. For example, reconfigurable Wavelength Division Multiplexed (WDM) optical networks, including Metro networks, Passive Optical Networks (PON), and high performance computing, make use of different wavelengths for various purposes, including a form of addressing. As such, many optical/photonic networks need devices that allow the selection of a wavelength to be added to or dropped from the transport link. Optical switches and tunable filters are also valuable in instrumentation applications, such as spectroscopy. Accordingly, there is a need for tunable optical elements which can be used as components for such devices.

Optical switches that are low-cost, low-power, and of a compact size are important components in optical cross connects (OXC), reconfigurable optical add-drop multiplexers (ROADM), and other optical networking systems. Photonic Integrated Circuits (PIC), utilizing, for example, Silicon-on-insulator (SOI) technologies, can provide high speed and small footprint. Silicon-on-insulator (SOI) is a promising technology for developing optical switches due to its relatively large thermo-optic coefficient, high thermal conductivity and high contrast refractive index. In recent years, various thermo-optic switch configurations have been reported on the SOI platforms.

Microring resonators (MRRs), also known as Microrings, fabricated in photonic integrated circuits have been widely researched for various applications, including wavelength tunable filters for optical networks. A microring is a waveguide loop that is typically circular but in principle may be any geometry. The microring is optically coupled to one or two transport waveguides. In a scenario in which the microring is coupled to a single waveguide, it provides the ability to remove a set of wavelengths from the transport waveguide, thus acting as a notch filter. In a scenario in which the microring is coupled to two transport waveguides, the transport waveguides couple light to/from the microring. If light transported by the first waveguide includes wavelengths which are resonant to the ring, then the resonant wavelengths of light can be coupled from the first transport waveguide into the ring, and propagate around the ring to be coupled to the second transport waveguide. Wavelengths of light that are not resonant to the ring are passed from the input of the first transport waveguide to the output of the first transport waveguide, and do not substantially interact with the microring. Filters with desirable bandpass characteristics may be formed by coupling multiple microrings to each other with or without intervening transport waveguides.

However there is a demand for ever increasing speeds, and smaller footprints for such systems. Further there is a need to reduce optical loss of such components, especially as the number of MRRs within a PIC increase. Further it is known that polymer waveguides can also be used within PICs. A polymer waveguide has a three dimensional freeform fabrication. The transmission loss of polymer waveguide is smaller, but has a lower light mode confinement compared to higher refractive index material, such as Silicon. Accordingly, in order to support single mode light transmission, the minimum size of polymer waveguides is larger than that of silicon waveguides due to the lower refractive index contrast between the waveguide core and the cladding. Further, polymer optical waveguides cannot turn or bend as effectively as silicon optical waveguides. Accordingly, while polymer waveguides can be suitable as transmission waveguides, the extra size and larger turn radius makes MRRs formed from polymer waveguides impractical.

Accordingly, there is a need for a system and method that at least partially addresses one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An aspect of the disclosure provides a microring resonator (MRR). Such an MRR includes a ring optical waveguide and an optical waveguide, with the optical waveguide configured such that a first portion of the optical waveguide overlaps a second portion of the ring waveguide. In some embodiments, the optical waveguide has a first refractive index and the ring optical waveguide has a second refractive index such that the first refractive index is less than the second refractive index. In some embodiments, the optical waveguide is a polymer optical waveguide and the ring optical waveguide is a silicon optical waveguide. In some embodiments, the optical waveguide is larger in height than the ring waveguide and the first portion of the optical waveguide is configured to provide space for the second portion of the ring waveguide. In some embodiments, optical waveguide and the ring optical waveguide rest on a horizontal insulator base, and the first portion of the optical waveguide overlaps the second portion of the ring optical waveguide in the horizontal dimension. In some embodiments, the first portion of the optical waveguide overlaps the second portion of the ring waveguide in an overlapping region. In some embodiments, the first portion of the optical waveguide is in contact with the second portion of the ring optical waveguide in the overlapping region. In some embodiments, the MRR further includes a gap between the first portion of the optical waveguide and the second portion of the ring optical waveguide in the overlapping region. In some such embodiments, the gap is filled with a refractive index matching material with a third refractive index between that of the first refractive index and the second refractive index. In some embodiments, the MRR further includes a coupling material interposed between the optical waveguide and the ring waveguide within the overlapping region, the coupling material having a third refractive index between that of the first refractive index and the second refractive index.

Another aspect of the disclosure provides a photonic circuit (PIC). Such a PIC includes a first optical waveguide formed from a first material with a first refractive index. Such a PIC further includes a plurality (N) of microring resonators (MRRs) optically coupled to the optical waveguide. Each of the N MRRs including a ring optical waveguide formed from a second material having a second refractive index, with the first refractive index less than the second refractive index. For each MRR, a first portion of the first optical waveguide overlaps a portion of each of the N ring waveguides. In some embodiments, each ring optical waveguide is configured to resonate at a different wavelength. In some embodiments, the first optical waveguide is a polymer optical waveguide, for each MRR the ring optical waveguide is a silicon optical waveguide. In some embodiments, the first optical waveguide is larger in height than each ring waveguide and for each MRR a portion of the optical waveguide is configured to provide space for the ring optical waveguide. In some embodiments, such a PIC further includes a horizontal insulator base. In such an embodiment, the first optical waveguide and each ring optical waveguide rest on a horizontal insulator base such that a first portion of the optical waveguide overlaps a second portion of each ring optical waveguide in the horizontal dimension. In some embodiments, the first portion of the optical waveguide overlaps the portion of each ring waveguide in an overlapping region. In some embodiments, such a PIC further includes a coupling material interposed between the optical waveguide and each ring waveguide within each overlapping region, the coupling material having a third refractive index between that of the first refractive index and the second refractive index.

Another aspect of the disclosure provides an optical device. Such an optical device includes a first optical waveguide, a ring optical waveguide, and a region of overlap between the first optical waveguide and the ring optical waveguide wherein a first portion of the first optical waveguide overlaps a second portion of the ring optical waveguide. In some embodiments, the first optical waveguide has a first refractive index and the ring optical waveguide has a second refractive index such that the first refractive index is less than the second refractive index. In some embodiments, such an optical device further includes a horizontal insulator base. In such an embodiment, the first waveguide and the ring waveguide rest on the horizontal insulator base, and the first portion of the first waveguide overlaps the second portion of the ring waveguide in the horizontal dimension.

BRIEF DESCRIPTION OF THE FIGURES

Further features and advantages of the present invention will become apparent from the following detailed description, taken in combination with the appended drawings, in which:

FIG. 3A illustrates a cross section of the MRR along section line 3-3 of FIG. 2B, in accordance with embodiments of the present invention.

It will be noted that throughout the appended drawings, like features are identified by like reference numerals.

DETAILED DESCRIPTION

A ring resonator (RR), also referred to as a microring resonator (MRR), is an optical waveguide ring which can optically couple with another optical waveguide, and depending on the implementation, an additional optical waveguide. Examples will be discussed assuming an MRR is coupled to two optical waveguides, but it should be appreciated that the additional optical waveguide is not necessary for some implementations (e.g. a notch filter).

Figure 1A:
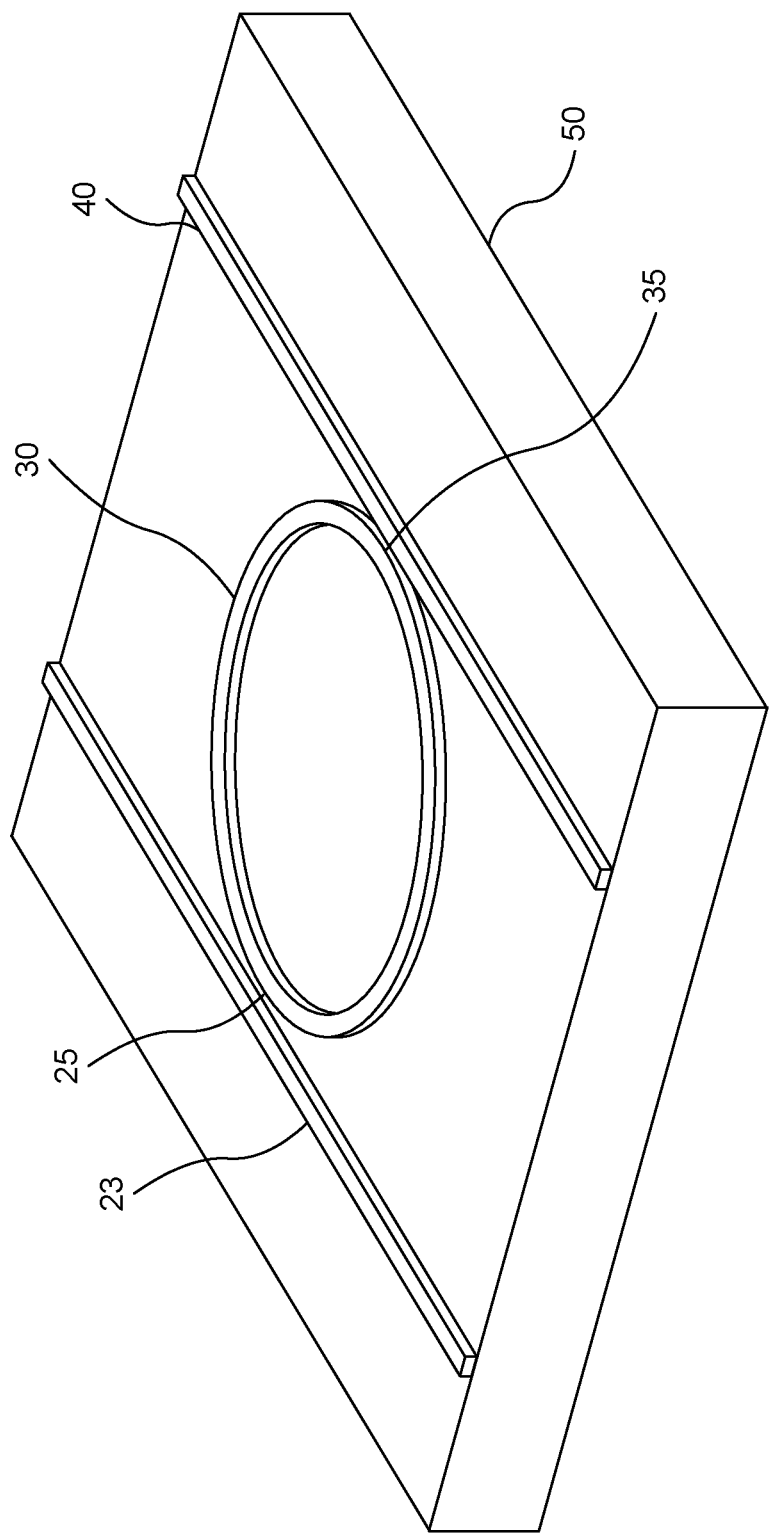
FIG. 1A schematically illustrates an isometric view of the MRR, whereas FIG. 1B schematically illustrates a top view of the MRR.
Figure 1B:
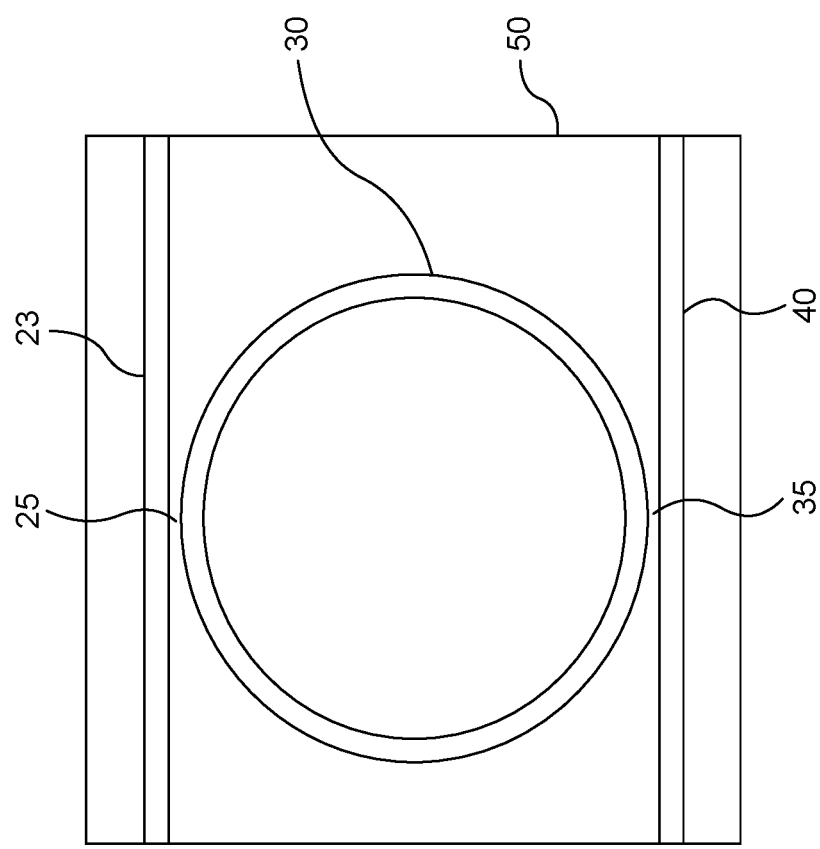
FIG. 1 schematically illustrates a conventional directional coupler based silicon MRR.

FIG. 1 schematically illustrates a conventional directional coupler based silicon MRR. FIG. 1A schematically illustrates an isometric view of the MRR, whereas FIG. 1B schematically illustrates a top view of the MRR. FIG. 1A illustrates an MRR 1 which includes three silicon optical waveguides on a silica base 50. The three silicon waveguides include circular ring waveguide 30 interposed between parallel silicon waveguides 23 and 40. The MRR is configured with gaps 25, 35 between the ring waveguide 30 and optical waveguides 23 and 40 respectively to allow for evanescent coupling between the ring 30 and the waveguides 23 and 40. Such an MRR can be tuned to resonate for particular wavelengths, such that light in waveguide 23 can be coupled to the waveguide 40 for the particular wavelengths. Such an arrangement is often used as part of an add/drop multiplexer. In such an example, silicon waveguide 23 acts as a transmission waveguide and silicon waveguide 40 acts as a drop waveguide for wavelength(s) to which the MRR is tuned. The directional coupler can be designed with any coupling ratio range from zero to unity at a given wavelength. The coupling ratio changed with the wavelength and waveguide dimensions at the directional coupler section. It should be appreciated that some MRRs utilize 2×2 multimode interference (MMI) couplers, in which case there is no gaps 25, 35, and a multimode joint section connects the ring waveguide 30 with waveguide 23 or 40. MMI based MRRs can have more loss and back reflection than directional coupler MRRs, but MMI based MMRs can have the advantages of better polarization tolerance and wider bandwidth.

Such a MRR includes a pair of electrodes (not shown) for shifting the resonant frequency of the ring, and an input interface for receiving a drive signal for driving the electrodes. Resonant frequency shifting in the MRR can be provided by an electro-optic effect (e.g., carrier injection) or thermo-optic effect. Accordingly, MRRs can be used in tunable switches and other optical elements.

Figure 2A:
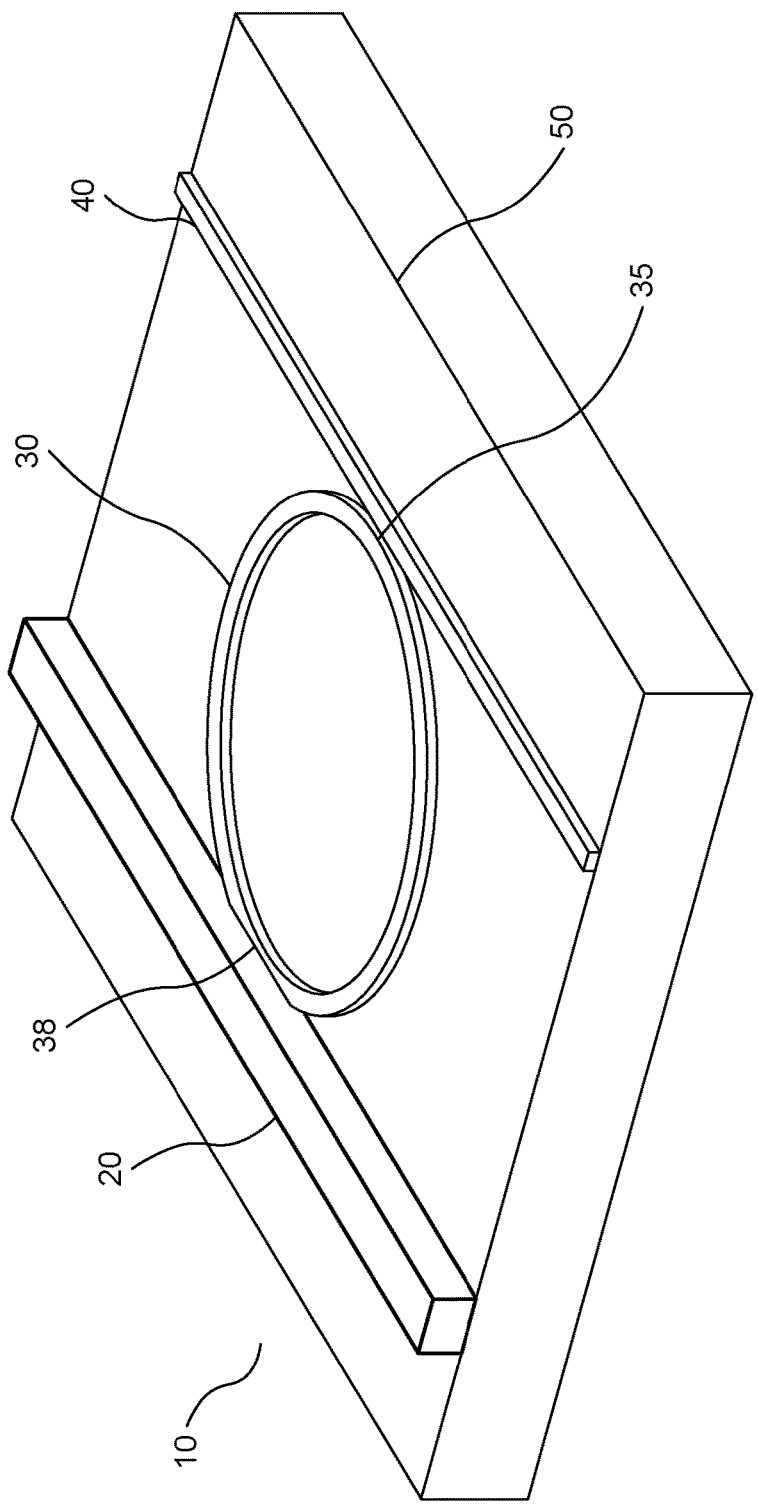
FIG. 2A schematically illustrates an isometric view of the MRR, whereas FIG. 2B schematically illustrates a top view of the MRR.
Figure 2B:
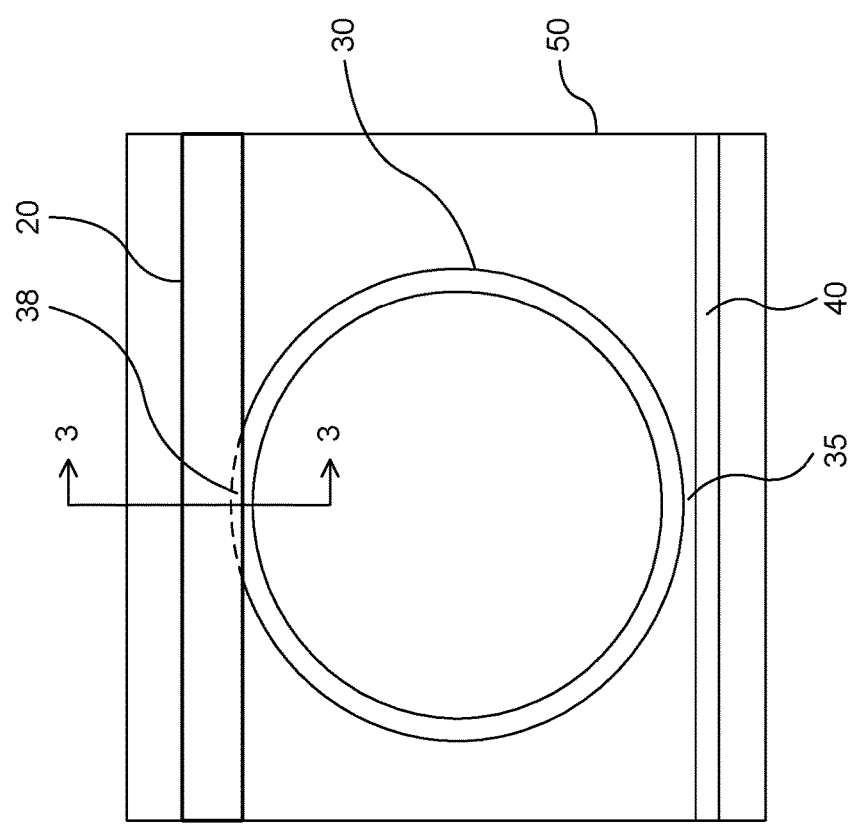
FIG. 2 schematically illustrates a MRR in accordance with embodiments of the present invention.

FIG. 2 schematically illustrates a MRR 10 in accordance with embodiments of the present invention. FIG. 2A schematically illustrates an isometric view of the MRR, whereas FIG. 2B schematically illustrates a top view of the MRR. FIG. 2A illustrates an MRR 10 which includes a polymer optical waveguide 20 and a silicon optical waveguide 40 on a silica base 50. The device also includes ring optical waveguide 30 interposed between the waveguides 20 and 40. The MRR is configured with gap 35 between the ring waveguide 30 and optical waveguide 40 to allow for directional coupling between the ring 30 and the silicon waveguide 40. However, there is no gap between the polymer optical waveguide 20 and the ring optical waveguide 30. Further there is no need for the addition of a MMI coupler between polymer optical waveguide 20 and the ring optical waveguide 30. Rather the polymer optical waveguide 20 is configured such that a first portion of the optical polymer waveguide 20 overlaps a second portion of the ring waveguide 30. This will be more apparent in the cross section illustrated in FIG. 3. Such an MRR can be tuned to resonate for particular wavelengths, such that light in waveguide 20 can be coupled to the waveguide 40 for the particular wavelengths. Such an arrangement can be used as part of an add/drop multiplexer or other optical elements as will be discussed below. In such an example, polymer waveguide 20 acts as a transmission waveguide and silicon waveguide 40 acts as a drop waveguide for wavelength(s) to which the MRR is tuned. Resonant frequency shifting of the MRR 10 can be provided by an electro-optic effect (e.g., carrier injection) or thermo-optic effect.

In the embodiment shown ring optical waveguide 30 is circular, but this is not a requirement. Other ring shapes can be utilized. One such example shape is a stadium or racetrack (a rectangle with semicircles at a pair of opposite sides). Further, while the embodiment illustrated utilizes directional coupling between the ring waveguide 30 and optical waveguide 40, an MMI coupler could be utilized.

Polymer optical waveguides have beneficial characteristics in some circumstances, including suffering less optical loss than silicon optical waveguides, which make their use advantageous for some types of PICs. Also, polymer waveguides can be easier to fabricate, for example using three-dimensional freeform fabrication. However, polymer waveguides can have lower light mode confinement compared to higher refractive index materials such as silicon. Accordingly, they tend to be larger than silicon optical waveguides, resulting in more footprint in PICs which utilize them. Further, polymer optical waveguides cannot turn or bend as effectively as silicon optical waveguides. Accordingly, a larger footprint bend radius can be required to utilize polymer waveguides in contrast to silicon waveguides, due to the lower refractive index contrast between the waveguide core and the cladding. Accordingly, it can be advantageous to use a combination of polymer and silicon optical waveguides within a PIC. For example, such a hybrid PIC can use polymer optical waveguides when reducing loss is important, and use silicon optical waveguides when size/footprint or radius of curvature is important. It is noted that while a polymer ring waveguide could be used to form an MRR, the radius of curvature of such a polymer ring waveguide would be significantly larger, making silicon ring waveguides more effective. Advantageously, embodiments provide efficient coupling between polymer optical waveguides and silicon ring optical waveguides.

In the embodiment illustrated in FIGS. 2A and 2B, the MRR 10 includes a region of overlap 38 between the polymer optical waveguide 20 and the ring waveguide 30. In this overlapping region 38, a first portion of the polymer optical waveguide 20 overlaps a second portion of the ring waveguide 30. This can be best seen in FIG. 3A.

FIG. 3A illustrates a cross section of the MRR along section line 3-3 of FIG. 2B, in accordance with embodiments of the present invention. In this figure height refers to the vertical direction, and width refers to horizontal direction (with length being the direction in/out of the page). As can be seen, the polymer waveguide 20 is larger than the ring waveguide 30, both in height and width. Embodiments make use of this extras size to improve the coupling efficiency between the polymer optical waveguide 20 and the ring optical waveguide 30 by including an overlapping region 38 in which the ring waveguide 30 appears embedded (or inserted) into the polymer waveguide 20. It is noted that in some embodiments, the ring waveguide can be inserted into the polymer waveguide. In other embodiments, depending on the fabrication process for producing the PIC, the ring waveguide 30 may not need to be physically inserted into the polymer waveguide 20, due to the layering process of fabrication, in which the polymer waveguide can be deposited over the silicon waveguide.

It should be appreciated that various embodiments can utilize a variety of materials. While examples have been given with respect to a polymer transmission waveguide and a silicon ring waveguide, such a device can be more generally described as having an optical waveguide and a ring waveguide, with optical waveguide overlapping a portion of the ring waveguide. Embodiments are discussed with the optical waveguide having a first refractive index and the ring optical waveguide having a second refractive index such that the first refractive index is less than the second refractive index. However, as there are many types of polymer waveguides examples will be discussed with respect to a range of refractive index differences between the two types of waveguides. The range depends on the two materials. Some non-limiting examples of the range of refractive index differences between silicon waveguides and polymer waveguides can be 1.9-2.3, depending on the materials. However, in some embodiments silicon nitride waveguides and polymer waveguides can be used, and some non-limiting examples of the range of refractive index difference between silicon nitride waveguide and a polymer waveguide can be 0.7-0.4 depending on the materials. As another example, in some embodiments glass waveguides and polymer waveguides can be used, and some non-limiting examples of the range of refractive index difference between a glass waveguide and a polymer waveguide is 0.1-0.3.

Figure 3B:
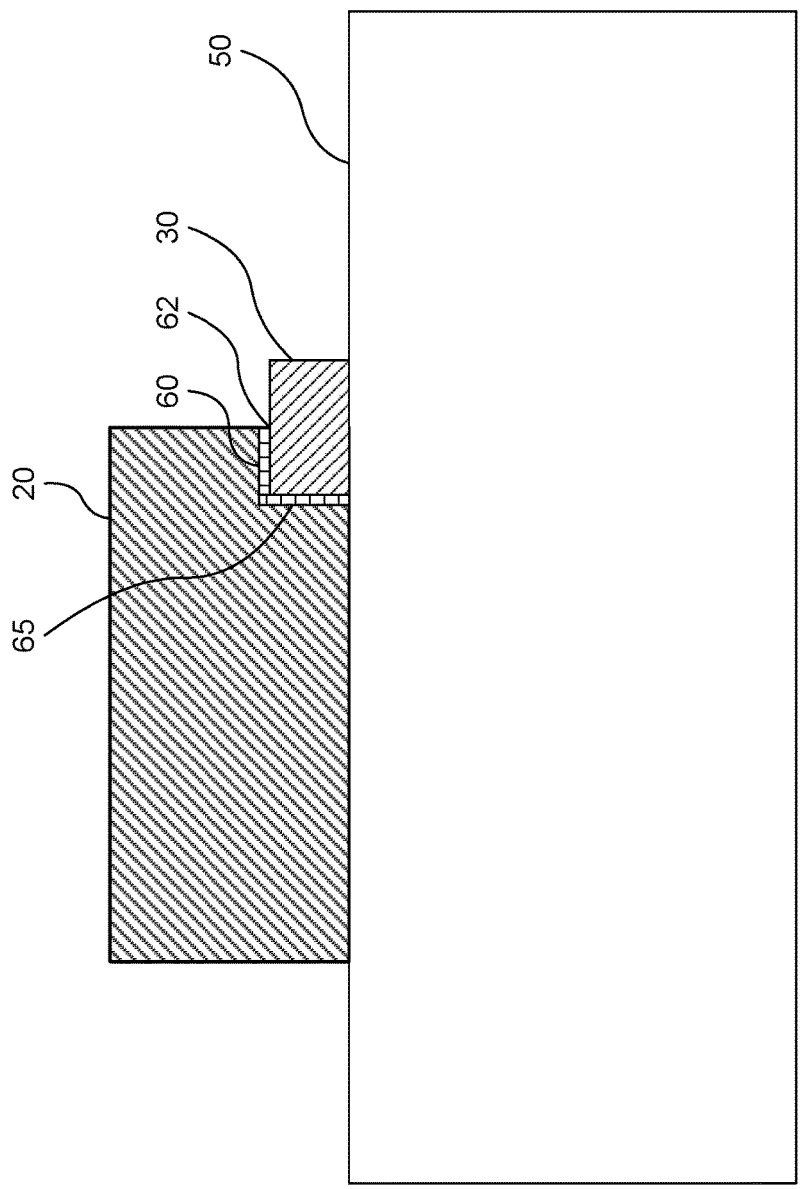
FIG. 3B illustrates an alternative embodiment in which a refractive index matching material is interposed between the polymer optical waveguide and the ring optical waveguide within the overlapping region.
Figure 4:
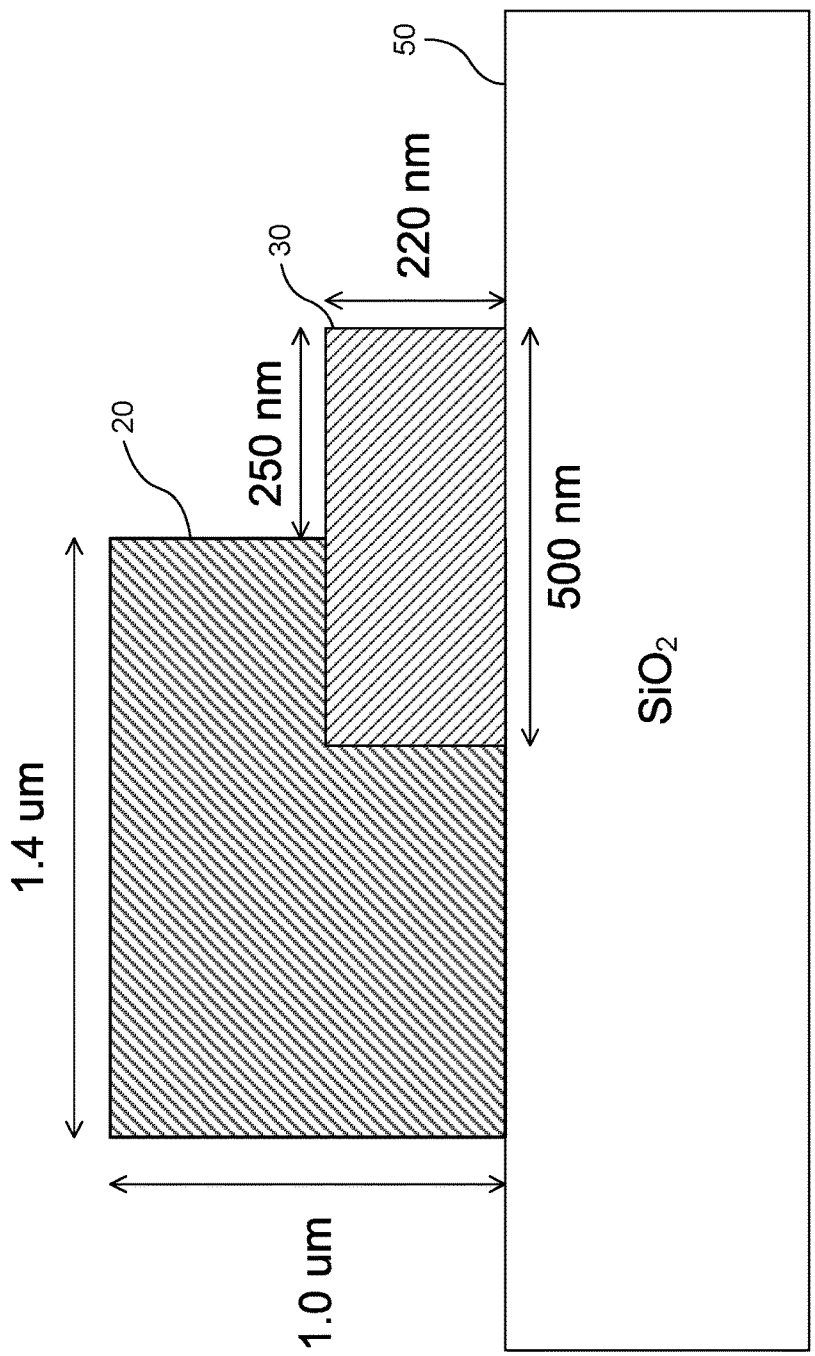
FIG. 4 illustrates example dimensions for an example of FIG. 3A in accordance with embodiments of the present invention.

FIG. 3B illustrates an alternative embodiment in which a refractive index matching material is interposed between the polymer optical waveguide 20 and the ring optical waveguide 30 within the overlapping region 60. In the embodiment illustrated, the coupling material is interposed horizontally at 62 between polymer optical waveguide 20 and the ring optical waveguide 30, and also interposed vertically at 65. In some embodiments the coupling material can be located at either, both or neither of 62, 65. The refractive index matching material has a refractive index between that of the polymer refractive index and the silicon refractive index to improve the coupling between polymer optical waveguide 20 and the ring optical waveguide 30 and to reduce possible back reflection. FIG. 4 illustrates example dimensions for an example of FIG. 3A in accordance with embodiments of the present invention. In this example, the polymer optical waveguide is 1.0 μm in height, and 1.4 μm in width. The ring waveguide, in cross section is 220 nm in height, and 500 nm in width, and at the point of the cross section, has half of its cross sectional width embedded within the polymer waveguide. However, there dimensions are just examples, and other dimensions can be utilized. In an embodiment, the polymer optical waveguide has a polymer core SU-8 with a refractive index of 1.57 at 1550 nm and a Cytop cladding with refractive index 1.34 at 1550 nm. It is noted the cladding of the polymer core is not shown. In some embodiments, the core of the polymer optical waveguide overlaps the core of the silicon optical waveguide.

Figure 5:
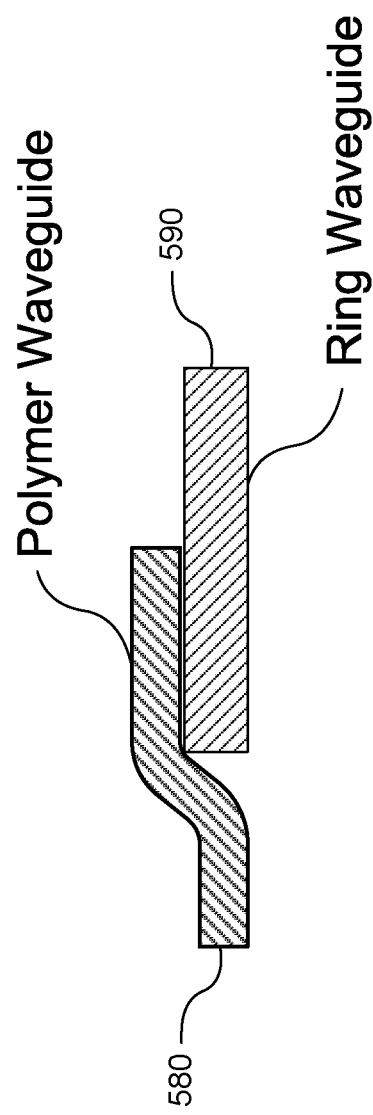
FIG. 5 illustrates an alternative embodiment, in which a smaller polymer waveguide partially overlaps a ring waveguide to achieve multimode coupling between the two waveguides.

FIG. 5 illustrates an alternative embodiment, in which a smaller polymer waveguide 580 partially overlaps a ring waveguide 590 to achieve multimode coupling between the two waveguides. In this example, the polymer waveguide has similar cross sectional dimensions to the ring waveguide. Such an embodiment may be useful if such factors as overlapping area, cladding material (Not shown), polymer core material and size of silicon waveguide is used to allow for a similarly sized polymer waveguide.

Figure 6:
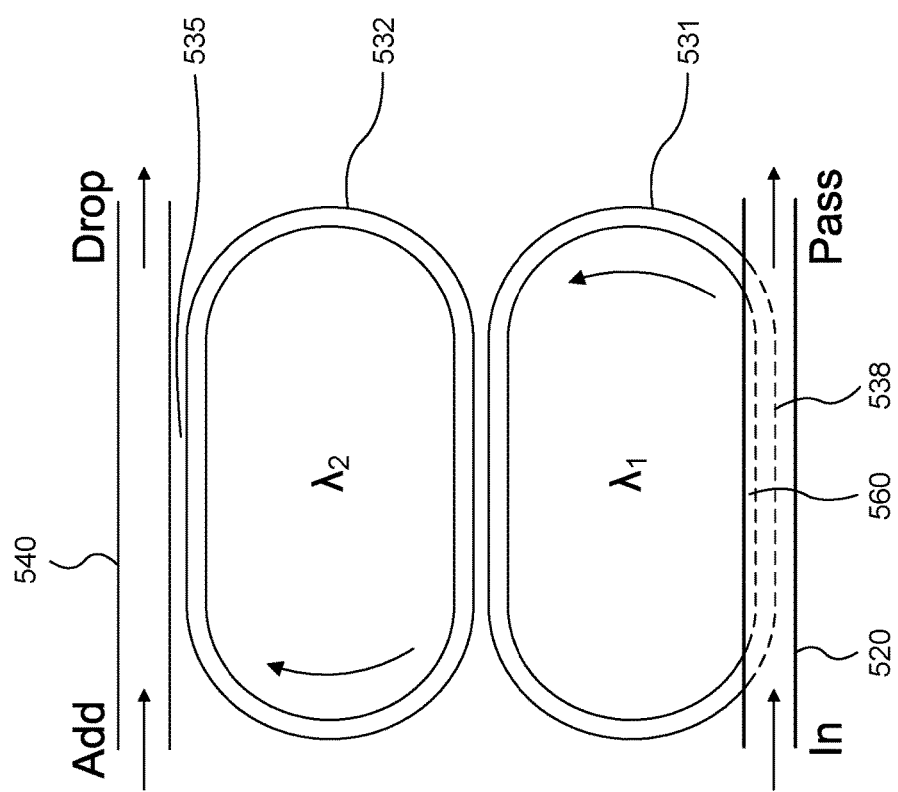
FIG. 6 illustrates an example of an MRR including two ring waveguides, in accordance with embodiments of the present invention.

Other embodiments can utilize cascaded MRRs. FIG. 6 illustrates an example of an MRR including two ring waveguides, according to an embodiment, although N order MRRs may be possible. FIG. 6 shows silicon optical ring waveguide 531 adjacent silicon optical ring waveguide 532 between silicon optical waveguide 540 and polymer optical waveguide 520. In this example, an optical signal within polymer optical waveguide 520 can passthru the waveguide 520 except for wavelength (s) $\lambda_2$ which are dropped via the rings and waveguide 540. In this example silicon optical ring waveguide 531 is configured to resonate at range of wavelengths designated as $\lambda_1$, and silicon optical ring waveguide 532 is configured to resonate at range of wavelengths designated as $\lambda_2$, with $\lambda_2$ being a subset of $\lambda_1$. FIG. 6 also illustrates a couple of alternative features that can be implemented in various embodiments, which can include single order embodiments. First, as noted above the ring waveguides need not be circular, and other shapes that allow for light to loop within the ring can be utilized. In the example illustrated in FIG. 6, silicon optical ring waveguide 531 and silicon optical ring waveguide 532 have stadium shapes. A stadium shape has two parallel portions with semicircles at either side linking the two parallel portions. Such a shape can increase the coupling efficiency by allowing for a larger area in which optical coupling occurs. Second, FIG. 6 also illustrates that the amount the polymer waveguide overlaps the silicon waveguide can vary. In the example shown in FIG. 4, the polymer waveguide overlapped half of the cross-sectional width of the silicon waveguide. However, FIG. 6 illustrates an example where the polymer waveguide 520 overlaps the entire cross sectional width of the silicon waveguide 531 at 560. Other variations can be utilized, depending on such factors as the materials used, the optical waveguide sizes, coupling length, and the amount of coupling required.

Figure 7:
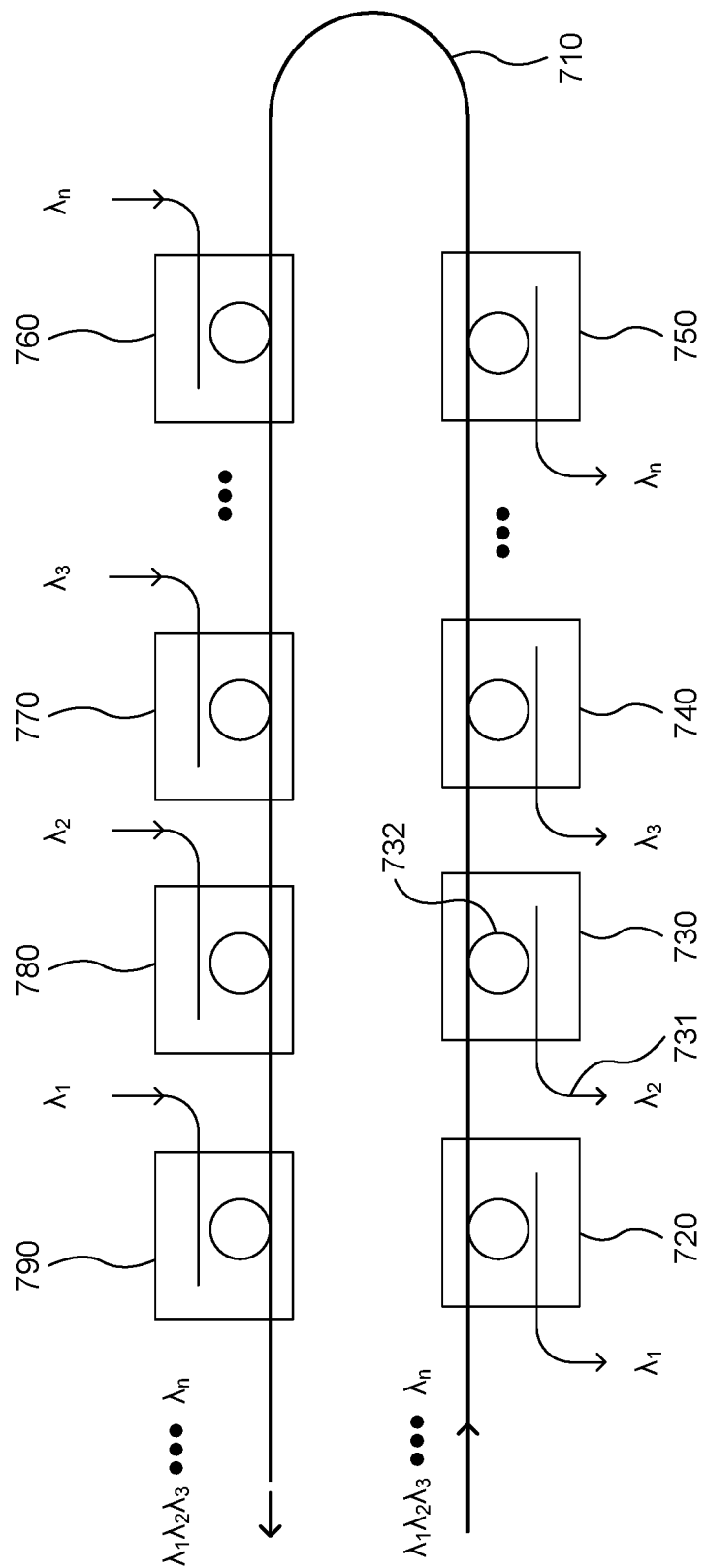
FIG. 7 illustrates an example PIC, such as a microring based switch matrix, in accordance with embodiments of the present invention.

As stated, the MRR structures discussed with respect to the various embodiments above can be integrated into various PIC structures. FIG. 7 illustrates an example PIC, such as a microring based switch matrix, in accordance with embodiments of the present invention. In such an example, a common polymer optical waveguide 710 carries a WDM signal including $\lambda_1\lambda_2\lambda_3 \ldots \lambda_n$ with a plurality of MRRs performing switching functions on individual wavelengths. In this example MRR 720 drops $\lambda_1$, MRR 730 drops $\lambda_2$, MRR 740 drops $\lambda_3$, and MRR 750 drops $\lambda_n$. Similarly, MRR 790 adds $\lambda_1$, MRR 780 adds $\lambda_2$, MRR 770 adds $\lambda_3$, and MRR 760 adds $\lambda_n$. Each MRR includes a silicon ring waveguide which couples with the common polymer optical waveguide 710 in a manner as discussed above. In other words, common polymer optical waveguide 710 overlaps a portion of each of the MRR silicon ring waveguides. Each MRR couples each ring to another optical waveguide, which carries a single wavelength in this example. For example, MRR 730 includes silicon ring waveguide 732, which is overlapped by the common polymer optical waveguide 710. MRR 732 is configured to resonate at $\lambda_2$, effectively coupling $\lambda_2$ to optical waveguide 731. Optical waveguide 731 can be a silicon optical waveguide or another polymer optical waveguide. It is noted that each MRR is shown as a box to schematically represent that each MRR can include other components, such as a tuner and an input for receiving a drive signal to tune the ring to resonate at a desired wavelength. It is noted that each MRR may have a ring waveguide with different path lengths to resonate at particular wavelengths and/or each can be tuned to alter the resonant wavelength using electro-optic techniques, thermo-optic techniques or other methods. It is noted that in some applications, the common polymer optical waveguide 710 may not be continuous, but can have a number of waveguides optically coupled using, for example, using polymer wire bonding.

Figure 8:
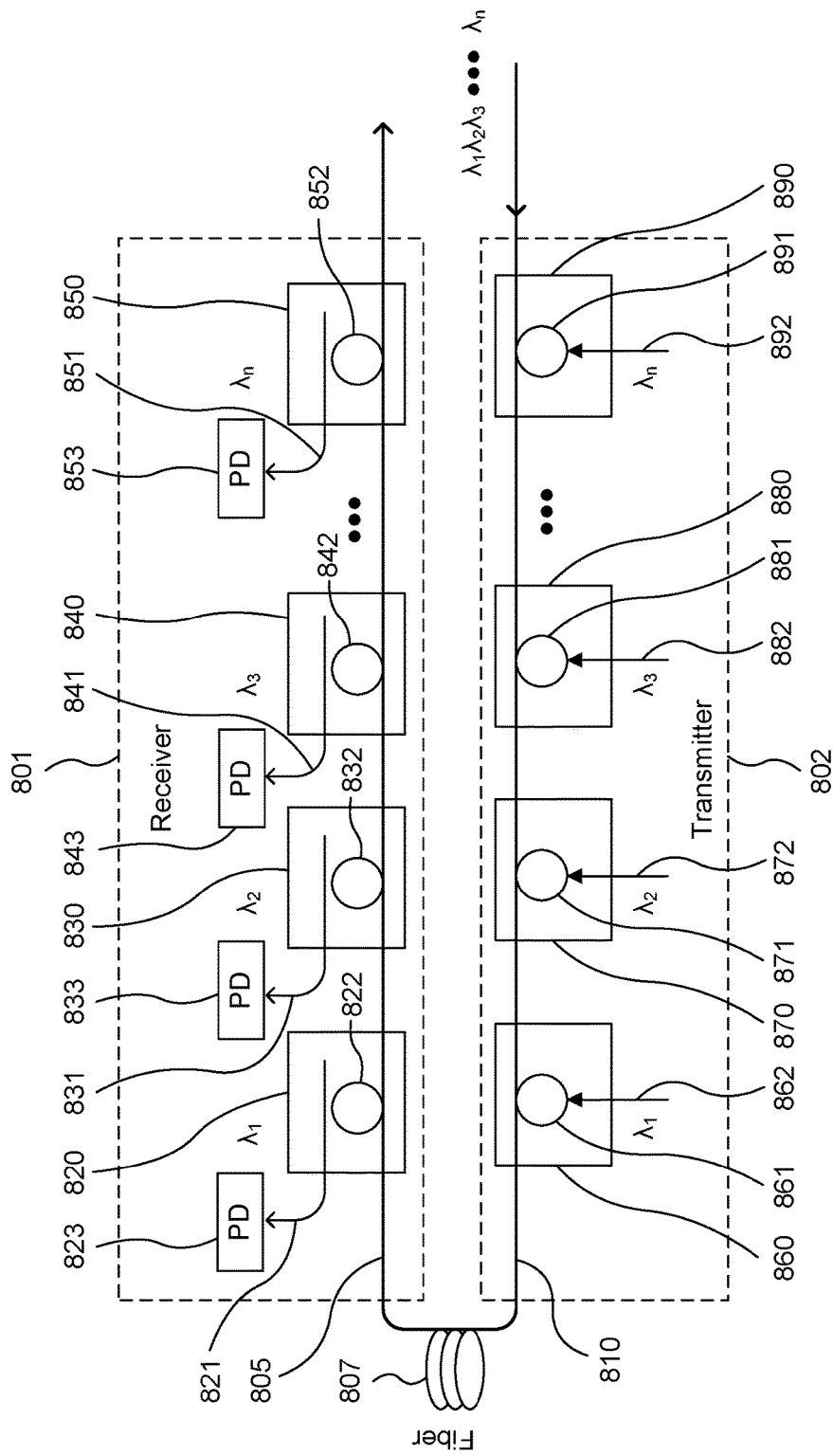
FIG. 8 illustrates an example of a PIC which acts a DWDM transceiver, in accordance with embodiments of the present invention.

FIG. 8 illustrates an example of a PIC which acts a DWDM transceiver, in accordance with embodiments of the present invention. Such a transceiver includes a receiver 801 and a transmitter 802. The receiver 801 and transmitter 802 can be implemented as separate PICs, in some embodiments. The transceiver receives WDM signals including $\lambda_1\lambda_2\lambda_3 \ldots \lambda_n$ from and transmits WDM signals including $\lambda_1\lambda_2\lambda_3 \ldots \lambda_n$ to network fibers 807, it being understood that the transceiver can transmit on one fiber and receive from another. Each of the transmitter and receiver can include a plurality of MRRs for add/drop functions on individual wavelengths. Each MRR can be tuned (tuner and drive signal not shown) to drop a particular wavelength to a photodetector (PD) via a drop optical waveguide (which can be silicon or polymer) coupled to the ring. In this example MRR 820 drops $\lambda_1$ to PD 823 via optical waveguide 821, MRR 830 drops $\lambda_2$ to PD 833 via optical waveguide 831, MRR 840 drops $\lambda_3$ to PD 843 via optical waveguide 841 and MRR 850 drops $\lambda_n$ to PD 853 via optical waveguide 851 from polymer optical waveguide 805. As per above, polymer waveguide 805 can be a continuous polymer waveguide or can be formed from segments of polymer waveguide optically coupled together, for example via polymer wire bonding.

On the transmitter side, light at each wavelength can be modulated directly by a MRR which act a modulator. A drive signal modulates data by modifying the resonant wavelength of the silicon ring, depending on datastream to be modulated. Accordingly, each MRR includes a silicon ring waveguide which overlaps transmit polymer waveguide 810 as discussed above. In this example, MRR 860 includes silicon ring waveguide 861 and adds data according drive stream 862 on $\lambda_1$, MRR 870 includes silicon ring waveguide 871 and adds data according to drive stream 872 onto $\lambda_2$, MRR 880 includes silicon ring waveguide 881 and adds data according to drive stream 882 onto $\lambda_3$, and MRR 890 includes silicon ring waveguide 891 and adds data according to drive stream 892 onto $\lambda_n$. Each MRR includes a silicon ring waveguide which couples with the common polymer optical waveguide 810 in a manner as discussed above. In other words, common polymer optical waveguide 810 overlaps a portion of each of the MRR silicon ring waveguides 861, 871, 881 and 891. In some embodiments, the silicon microring for each modulator and filter can be fabricated on a single PIC chip. The polymer waveguide can be fabricated on top of PIC chip. Using such a common polymer waveguide can reduce insertion loss, as contrasted by similar designs which utilize silicon waveguides interconnecting each ring. As discussed above, in some cases the common polymer waveguide need not be a single structure, but can be fabricated as sections of interconnected polymer waveguides.

It should be appreciated that a PIC can include more than one polymer optical waveguide. It should be appreciated that the examples illustrated in FIGS. 7 and 8 can represent portions of a PIC which includes additional circuit components or multiples of each circuit portion.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A microring resonator (MRR) comprising: a ring optical waveguide core; and an optical waveguide core, the optical waveguide core configured such that a first portion of the optical waveguide core provides space for a second portion of the ring waveguide core such that the first portion of the optical waveguide core overlaps the second portion of the ring waveguide core; wherein the optical waveguide core is larger in height than the ring optical waveguide core and the second portion of the ring optical waveguide core is embedded into the first portion of the optical waveguide core.

2. The MRR as claimed in claim 1 wherein the optical waveguide core has a first refractive index and the ring optical waveguide core has a second refractive index such that the first refractive index is less than the second refractive index.

3. The MRR as claimed in claim 1 wherein the optical waveguide core is a polymer optical waveguide core and the ring optical waveguide core is a silicon optical waveguide core.

4. The MRR as claimed in claim 1 wherein the optical waveguide core and the ring optical waveguide core rest on a horizontal insulator base, and the first portion of the optical waveguide core overlaps the second portion of the ring optical waveguide core in the horizontal dimension.

5. The MRR as claimed in claim 2 wherein the first portion of the optical waveguide core overlaps the second portion of the ring waveguide core in an overlapping region.

6. The MRR as claimed in claim 5 wherein the first portion of the optical waveguide core is in contact with the second portion of the ring optical waveguide core in the overlapping region.

7. The MRR as claimed in claim 5 further comprising a gap between the first portion of the optical waveguide core and the second portion of the ring optical waveguide core in the overlapping region.

8. The MRR as claimed in claim 7 wherein the gap is filled with a refractive index matching material with a third refractive index between that of the first refractive index and the second refractive index.

9. The MRR as claimed in claim 5 further comprising a coupling material interposed between the optical waveguide core and the ring waveguide core within the overlapping region, the coupling material having a third refractive index between that of the first refractive index and the second refractive index.

10. A photonic circuit comprising: a first optical waveguide core formed from a first material with a first refractive index; a plurality (N) of microring resonators (MRRs) optically coupled to the optical waveguide core; each of the N MRRs including a ring optical waveguide core formed from a second material having a second refractive index, with the first refractive index less than the second refractive index; and wherein a first portion of the first optical waveguide core overlaps a portion of each of the N ring waveguide cores; wherein the first optical waveguide core is larger in height than the ring optical waveguide core and the second portion of the ring optical waveguide core is embedded into the first portion of the first optical waveguide core.

11. The photonic circuit as claimed in claim 10 wherein each ring optical waveguide core is configured to resonate at a different wavelength.

12. The photonic circuit as claimed in claim 11 wherein the first optical waveguide core is a polymer optical waveguide core, for each MRR the ring optical waveguide core is a silicon optical waveguide core.

13. The photonic circuit as claimed in claim 12 wherein the first optical waveguide core is larger in height than each ring waveguide core and for each MRR a portion of the optical waveguide core is configured to provide space for the ring optical waveguide core.

14. The photonic circuit as claimed in claim 10 further comprising a horizontal insulator base and first optical waveguide core and each ring optical waveguide core rest on a horizontal insulator base such that a first portion of the optical waveguide core overlaps a second portion of each ring optical waveguide core in the horizontal dimension.

15. The photonic circuit as claimed in claim 10 wherein the first portion of the optical waveguide core overlaps the portion of each ring waveguide core in an overlapping region.

16. The photonic circuit as claimed in claim 15 further comprising a coupling material interposed between the optical waveguide core and each ring waveguide core within each overlapping region, the coupling material having a third refractive index between that of the first refractive index and the second refractive index.

17. An optical device comprising: a first optical waveguide core; a ring optical waveguide core; and a region of overlap between the first optical waveguide core and the ring optical waveguide core wherein a first portion of the first optical waveguide core overlaps a second portion of the ring optical waveguide core; wherein the first optical waveguide core is larger in height than the ring optical waveguide core and the second portion of the ring optical waveguide core is embedded into the first portion of the first optical waveguide core.

18. The optical device as claimed in claim 17 the first optical waveguide has a first refractive index and the ring optical waveguide has a second refractive index such that the first refractive index is less than the second refractive index.

19. The optical device as claimed in claim 18 further comprising a horizontal insulator base and wherein:
the first waveguide core and the ring waveguide core rest on the horizontal insulator base; and
the first portion of the first waveguide core overlaps the second portion of the ring waveguide core in the horizontal dimension.

* * * * *